(12) United States Patent
Hurler (10) Patent No.: US 7,524,157 B2
(45) Date of Patent: Apr. 28, 2009

(54) VEHICLE WITH LOADING BOXES OR LOADING SURFACES

(76) Inventor: Walter Hurler, Breitenbergweg 8, 86391 Stadtbergen (DE)

( * ) Notice: Subject to any disclaimer, the term of this patent is extended or adjusted under 35 U.S.C. 154(b) by 520 days.

(21) Appl. No.: 10/534,838

(22) PCT Filed: Nov. 11, 2003

(86) PCT No.: PCT/EP03/12548

§ 371 (c)(1),
(2), (4) Date: Jun. 21, 2005

(87) PCT Pub. No.: WO2004/043735

PCT Pub. Date: May 27, 2004

(65) Prior Publication Data

US 2006/0013678 A1  Jan. 19, 2006

(30) Foreign Application Priority Data

Nov. 13, 2002 (DE) .................. 102 52 682

(51) Int. Cl.
*B60P 1/02* (2006.01)
(52) U.S. Cl. .............. 414/545; 296/35.1; 280/800
(58) Field of Classification Search .......... 414/545, 414/537; 296/35.1, 39.3, 186.2, 186.3, 186.4; 280/800; 362/487, 493
See application file for complete search history.

(56) References Cited

U.S. PATENT DOCUMENTS

| | | | |
|---|---|---|---|
| 747,899 A * | 12/1903 | Wall | 414/545 |
| 4,283,066 A * | 8/1981 | Brown et al. | 280/838 |
| 4,652,042 A | 3/1987 | Bader | |
| 4,659,132 A | 4/1987 | Day | |
| 6,099,070 A * | 8/2000 | Yocum | 296/182.1 |
| 6,234,740 B1 * | 5/2001 | Page | 414/545 |
| 6,464,446 B1 | 10/2002 | Hurler | |
| 2003/0214155 A1 * | 11/2003 | Kiehl et al. | 296/204 |

FOREIGN PATENT DOCUMENTS

| | | |
|---|---|---|
| CA | 1 107 790 A | 8/1981 |
| DE | 82 34 715 U | 3/1983 |
| DE | 41 14 044 A | 11/1991 |
| DE | GM 298 13 993 | 11/1998 |
| EP | 1 232 904 A | 8/2002 |
| FR | 1 509 096 A | 1/1968 |
| FR | 1 554 461 A | 1/1969 |
| GB | 677 446 A | 8/1952 |
| GB | 2 203 184 A | 10/1988 |
| WO | WO 95/17319 | 6/1995 |

* cited by examiner

*Primary Examiner*—Donald Underwood
(74) *Attorney, Agent, or Firm*—Davis & Bujold, P.L.L.C.

(57) ABSTRACT

A vehicle provided with at least one front axis and at least one rear axis, one vehicle frame and at least one loading box or loading surface which can be raised or lowered in a vertical direction by way of lifting devices, in addition to a loading ramp located in the rear area of the vehicle. At least one loading box or loading surface is arranged behind at least one rear axis such that it forms an inner loading ramp (9). At least one opening surface is arranged in a lateral (16) and rear position (20) on the vehicle frame and used to release loading openings for loading or emptying.

20 Claims, 5 Drawing Sheets

VEHICLE WITH LOADING BOXES OR LOADING SURFACES

This application is a national stage completion of PCT/EP2003/012548 filed Nov. 11, 2003 which claims priority from German Patent Application Serial No. 102 52 682.6 filed Nov. 12, 2002.

FIELD OF THE INVENTION

The invention relates to a vehicle provided with at least one front axle and at least one rear axle, with loading boxes or loading surfaces to accommodate cargo, with a vehicle frame and with a loading ramp situated in the rear area of the vehicle frame, in conjunction with which at least one part of the loading boxes or the loading surfaces is capable of being raised and lowered in a vertical direction by means of lifting devices arranged on the vehicle frame.

BACKGROUND OF THE INVENTION

A vehicle of this kind is described, for example, in EP 0 733 003 B1 and in DE 298 13 998 U.

For the purpose of loading and unloading goods vehicles, it is often necessary to use forklift trucks or similar lifting devices in order to lift the cargo from the ground onto the frequently relatively high loading surface, and to set it down again.

In order to facilitate the loading and unloading procedure, goods vehicles are frequently also equipped externally at the rear with loading ramps, which generally exhibit a depth of ca. 2 m. In the driving mode, the loading ramp is folded vertically upwards against the rear end of the vehicle. For loading and unloading purposes, this ramp is brought into a horizontal attitude as a first stage by means of hydraulic lifting cylinders. The rear end of the vehicle is opened, and the goods to be unloaded are pushed onto the loading ramp. The loading ramp is then lowered to the ground by means of further cylinders.

A disadvantage associated with this process, however, is the need for a correspondingly large maneuvering distance or space behind the vehicle for lowering the loading ramp, which often leads to problems due to a lack of available parking space. Moreover, the loading ramp in its raised, horizontal position not only constitutes a traffic obstruction, but also represents a source of danger, in particular to the riders of motorcycles and bicycles.

Since, with the loading ramp in its upper raised position, the ramp is situated at a height of more than 1 m, an additional risk of accident exists in conjunction with loading and unloading, especially if the loading ramp is made slippery by snow or rain.

SUMMARY OF THE INVENTION

The object of the present invention is thus, in the case of a vehicle of the aforementioned nature, in conjunction with which the facility for significantly easier loading and unloading is created by means of the loading boxes or the loading surfaces that are capable of being lowered, additionally to improve these even further, and in particular to create a means of loading and unloading which saves maneuvering space.

This object is achieved in accordance with the invention in that the at least one loading surface or loading box behind the at least one rear axle is arranged in such a way that it is executed as an internal loading ramp, in conjunction with which at least one lateral opening surface and at least one rearward-facing opening surface are arranged on the vehicle frame, which opening surfaces expose loading openings for the purpose of loading or unloading.

By means of the embodiment in accordance with the invention, the previously externally arranged loading ramp is practically relocated in the interior of the vehicle, in conjunction with which a clear reduction is achieved in the external maneuvering space required for loading and unloading. Space can be saved at the rear in this way, for example, by dispensing with an external loading ramp. The fact that opening surfaces are also provided on one or both sides of the vehicle means that no space at all is now required behind the vehicle for loading and unloading, should this situation arise.

In the embodiment in accordance with the invention, the whole of the overhang of the vehicle frame behind the rear axle can be executed as an internal loading ramp, for example. This means that the area behind the rear axle essentially acts as a loading ramp in the form of one or more moving loading boxes or loading surfaces, which are capable of being displaced by lifting devices from a driving position to an unloading position on the ground. Any desired intermediate positions are likewise possible for the loading ramp in accordance with the invention. In exactly the same way, it can also be raised to the ramp height of buildings.

It is possible in conjunction with this, for example, to provide for the arrangement of a roller door on the rear of the vehicle, which is capable of being displaced in lateral guides, for example. One, or preferably both, of the lateral surfaces can be provided with sliding doors in one embodiment of the invention, which doors can be slid in a forward direction to permit unloading and in so doing completely expose lateral opening surfaces.

In a highly advantageous further development of the invention, two sliding doors arranged on either side can be provided with vertical guides, in which the rear roller door runs, which roller door in its opened state is slid into a stowage area in the roof structure.

In a further advantageous embodiment, the one or more sliding doors can be provided on their rear side with inward-facing angled sections, to which the rear lighting of the vehicle and, if necessary, other arrangements that are required at the rear of the vehicle are attached.

In an embodiment of this kind, in the lowered state or even in intermediate positions, or with the at least one rear loading box or loading surface at ramp height, this is accessible from all three sides, namely from the rear and from both sides, without the need for inconvenient retaining limbs or stabilizing devices.

The attachment and also the guide for the sliding door, or for the two sliding doors, and for the roller door can be effected in the roof structure that is present at the rear above the rear axle.

If the one or more lateral sliding doors are not arranged over the total height of the vehicle, but if an area for a lateral enclosing wall is left in the lower area, or if space is provided additionally thereto, the lateral enclosing wall can then serve as an access ramp in its lowered state, for which purpose it is caused to pivot laterally outwards to a corresponding extent. The same is true of the rear of the vehicle with the roller door.

A further advantage of the solution in accordance with the invention is embodied in the fact that existing vehicles can also be converted in accordance with the invention without problem at a later date. All that is necessary for this purpose, in the case of a vehicle with a ladder frame, in which two longitudinal members arranged laterally at a mutual distance from one another with interjacent transverse members are provided, is to cut the ladder frame in the vicinity of the rear axle. If the C-pillar, which is arranged in the vicinity of the rear axle of the vehicle, is then provided with a lifting device, one or more loading boxes or loading surfaces that are capable of being raised and lowered can be attached as a complete subassembly, in conjunction with which the loading boxes or loading surfaces can be supported on the lifting device in association with a portal-like construction. In this case, only the roof structure projects rearwards in its original nature and manner beyond the rear axle. All that then remains in this case is to provide a receiving device in the roof structure for the rear opening surface, for example a roller door, and to install retaining devices and guide rails for the one or more sliding doors.

As an alternative to this, it is, however, also possible to leave the vehicle superstructure with the ladder frame unchanged, in conjunction with which the possibility of operation with a trailer is also afforded. In this case, it is also possible to provide correspondingly narrower, height-adjustable loading boxes or loading surfaces on one side, or also on both sides of the ladder frame. These loading boxes or loading surfaces can then be adjusted vertically in an identical fashion via a lifting device with a portal construction arranged on the C-pillar. In this case, however, the internal loading ramp is divided into two and is only accessible from the side in each case.

A highly advantageous further development of the invention may involve the provision of an auxiliary frame for a chassis superstructure with loading boxes or loading surfaces, with lifting devices for the loading boxes or loading surfaces, with the internal loading ramp together with the roof structure and opening surfaces, which auxiliary frame is capable of attachment to the longitudinal members of the ladder frame.

Prefabrication of the vehicle superstructure in accordance with the invention is a practical possibly thanks to the auxiliary frame, in conjunction with which the auxiliary frame can be securely attached to the standard ladder frame of the vehicle essentially in a single assembly process by means of corresponding attachment members after prefabrication of this kind.

In addition to facilitating assembly in this way, and to the advantages associated with prefabrication, this embodiment also offers the advantage that, in the case of repairs or in the event of an accident, the vehicle and the vehicle superstructure can be replaced in a simple fashion.

Advantageous further developments and arrangements of the invention can be appreciated from the other subordinate claims and from the following illustrative embodiments described in principle below with reference to the drawing.

DETAILED DESCRIPTION OF THE PREFERRED ENBODEMENTS

Figure 1:
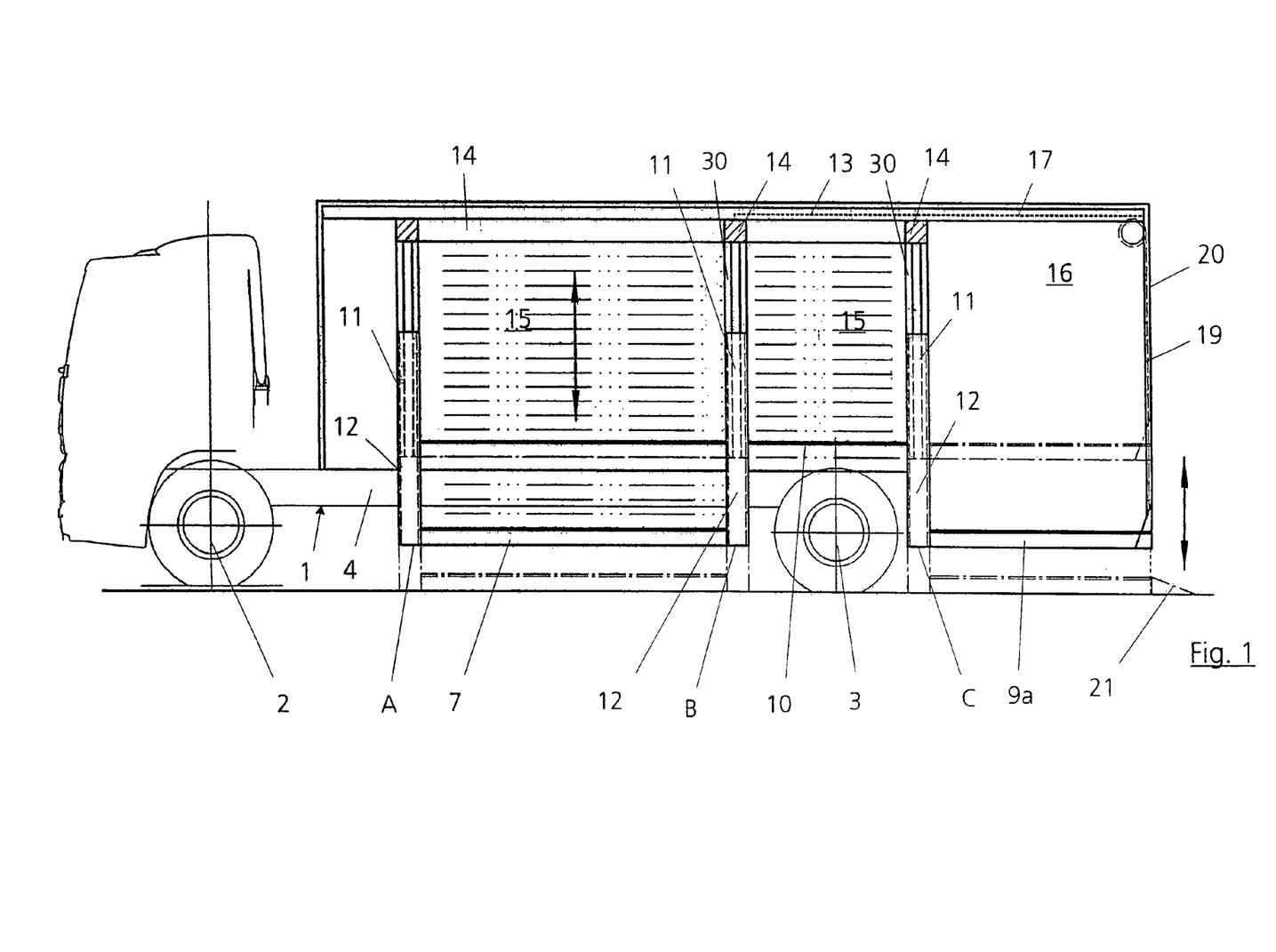
FIG. 1 is a side view of the vehicle in accordance with the invention with an internal loading ramp.
Figure 2:
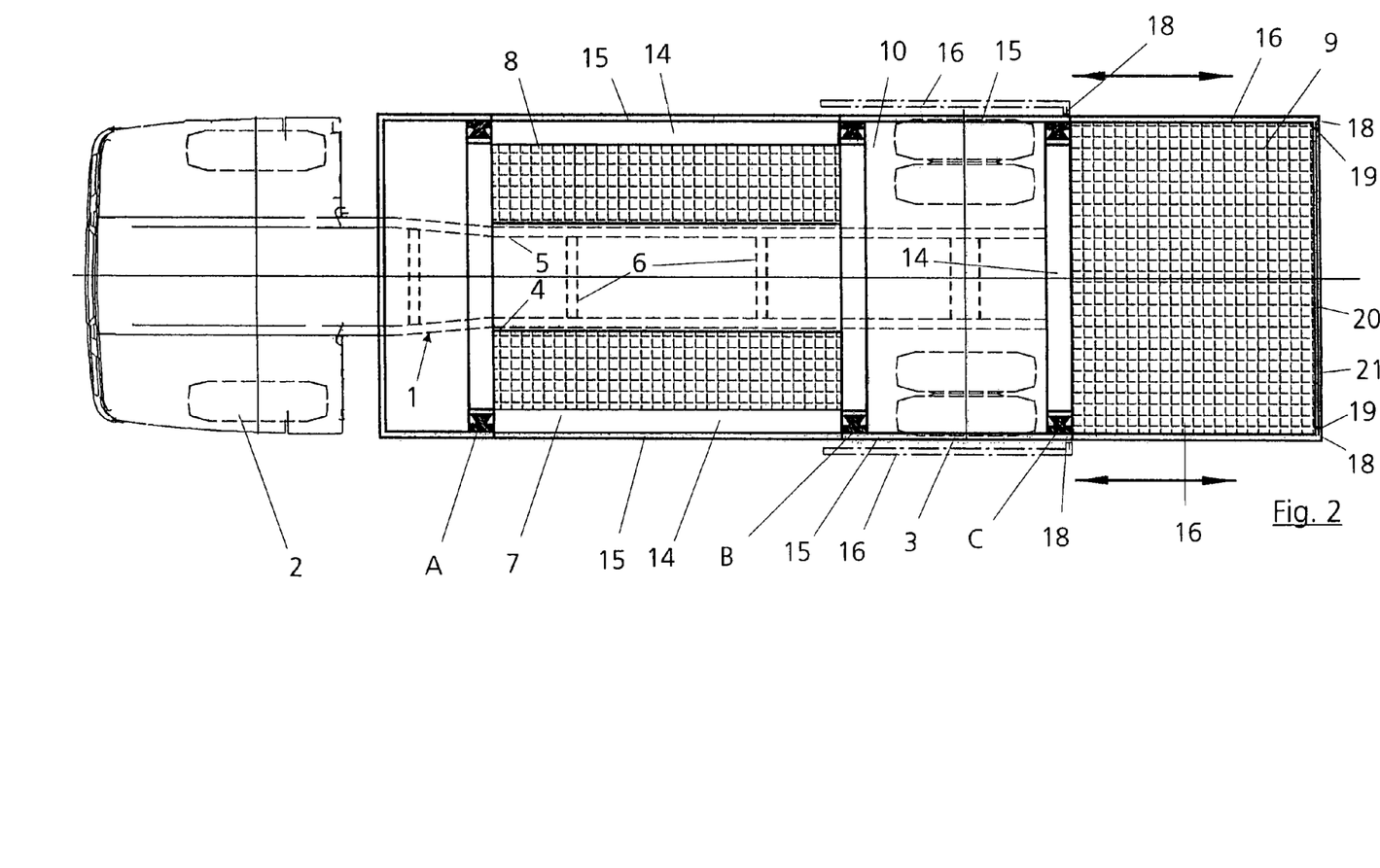
FIG. 2 is a top view of the vehicle in accordance with FIG. 1.
Figure 3:
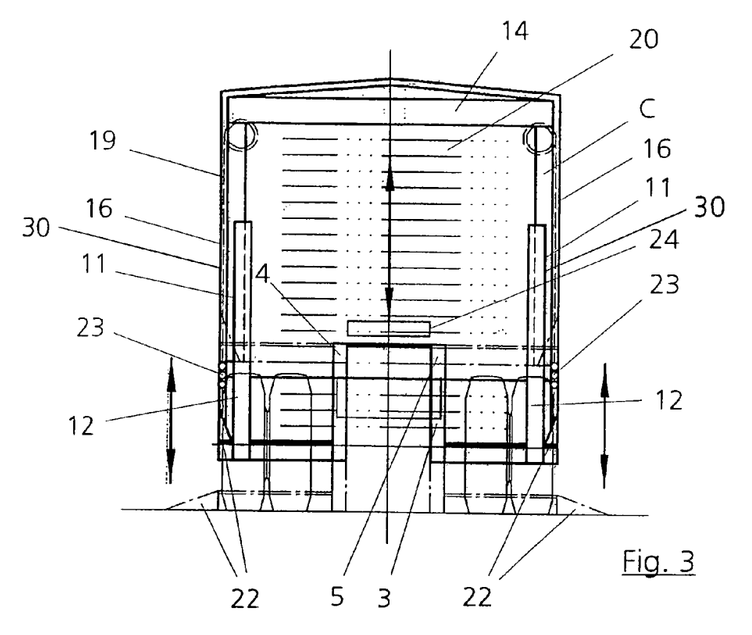
FIG. 3 is a rear view of the vehicle in accordance with FIG. 1.

A vehicle with a vehicle frame 1 as represented in FIGS. 1 to 3 generally exhibits a front axle 2 and a rear axle 3. Of course, more than one front axle 2 or rear axle 3 may be provided in each case. A total of two loading boxes or loading surfaces 7 and 8 that are capable of adjustment in a vertical direction are provided on the vehicle frame 1, which is equipped with a ladder frame having two longitudinal members 4 and 5 running at a distance from one another in the longitudinal direction, and with interjacent transverse members 6, which boxes or surfaces are situated on both sides of the longitudinal members 4 and 5 of the ladder frame and adjacent to it. A third loading box or loading surface 9 that is capable of adjustment in a vertical direction is present behind the rear axle 3. The third loading box 9 can extend over the entire width of the vehicle.

Present above the rear axle 3 is a further loading box 10, although this is not capable of vertical adjustment.

The loading boxes 7, 8 and 9 that are capable of vertical adjustment can be lowered from a driving position to an unloading position by means of lifting devices 11, not illustrated in detail here, with lifting cylinders 12, to which they are attached, in conjunction with which, in the fully lowered position, the loading surfaces of the loading boxes 7, 8, 9 are present at the level of the road surface.

It is similarly possible, if the need arises, to raise the loading boxes 7, 8 or 9 to a ramp height of 1100 mm, for example, for loading and unloading. An appropriate free space below a roof structure 13 is kept clear for this purpose between the upper edges of the loading boxes 7, 8 and 9.

Two lifting cylinders 12 arranged for the loading boxes 7 and 8, on either side of the vehicle in each case, are attached to one another via their lifting device 11 and a lateral portal 14 in each case, as a consequence of which corresponding stability and an increase in the rigidity of the vehicle are achieved. The rear loading box 9 is capable of vertical adjustment by means of a lifting device 11 provided with a transverse portal 14. The loading boxes 7, 8 and 9 are capable in each case of vertical adjustment independently of one another by means of the separate lifting devices 11.

On one side of the vehicle, or preferably on both sides of the vehicle, the loading boxes 7, 8 and 10 are closed by means of roller doors 15, which in the opened state can be slid in and under the roof structure 13 in a manner that is not represented here in detail.

Whereas the vehicle frame 1 with the two longitudinal members 4 and 5 of the ladder frame does not normally extend as far as the rear end of the vehicle, the vehicle frame 1 and the two longitudinal members 4 and 5 are cut shortly behind the rear axle 3, as can be appreciated in FIGS. 1 and 2. The vehicle generally possesses three pillars for stabilization in the customary fashion, namely a so-called A-pillar, B-pillar and C-pillar. The C-pillar in this case is located shortly behind the rear axle 3. The two longitudinal members 4 and 5 are cut at this point. A lifting device 11 with a lifting cylinder 12 arranged on either side in each case is also attached to the C-pillar. A portal structure 14 connects the two lifting cylinders 12 to one another. The loading box 9 is attached to the lifting device 11 in such a way as to be capable of vertical adjustment in a manner that is not illustrated here in any detail. The loading box 9 consists essentially of a lower loading surface 9a.

Sliding doors 16 are arranged on both sides of the vehicle as opening surfaces in the vicinity of the loading box 9. The sliding doors 16 are attached on their upper side to the roof structure 13 via a guide rail 17, not illustrated in detail here, in such a way as to be capable of displacement in the longitudinal direction of the vehicle. The sliding arrangements for the sliding doors 16 may exhibit in a previously disclosed fashion sliding links with a knuckle joint, of the kind commonly encountered generally in goods vehicle doors. In conjunction with this, the two sliding doors 16 swing out slightly to the side, so that in the opened state they lie between the B-pillar and the C-pillar above the rear axle 3, as can be appreciated from FIG. 2.

The two sliding doors 16 exhibit inward-facing angled sections 18 at their rear ends. Present on the angled sections 18 are vertical guide rails 19 that are not illustrated in detail here. The slats of a roller door 20 are guided in the two guide rails 19 with the two sliding doors 16 in the closed state.

As can be appreciated, the rear loading box 9 with its loading surface 9a is executed as an internal loading ramp. With the vehicle in driving mode, the loading box 9 with the loading surface 9a is present as a loading ramp at the same height as the other loading boxes 7 and 8 with a corresponding ground clearance. The loading box 9 in this case represents a normal, outwardly closed loading space in the interior of the vehicle.

For the purposes of loading and unloading drinks crates, for example, the loading box 9 can be lowered to the level of the road surface. Whereas only the two roller doors 15 need to be opened for the purposes of loading and unloading the loading boxes 7 and 8, in conjunction with which access is afforded to the loading boxes 7 and 8 from the sides, accessibility from all sides can be achieved in the case of the rear loading box 9. For this purpose, in a first stage, the roller door 20 is pushed upwards and is slid into a guide or a box in the roof structure 13 in a manner that is not represented here in detail. The two sliding doors 16 can then be slid on the outside, in the direction of the arrow in FIG. 2, towards the front between the B-pillar and the C-pillar. As can be appreciated from FIG. 2, the opening surfaces are thus exposed to permit access on all sides, and without the presence of any inconvenient supports, bearers or other built-in devices. The loading box 9 with the loading surface 9a functions in this position as a normal loading ramp with accessibility from all sides, because the loading surface 9a is also at the level of the road surface.

An additional, folding enclosing wall 21 can also be provided at the rear, which wall, in the lowered state, is lowered from the vertical position in which it is present in the driving mode to a horizontal position, as can be appreciated from FIG. 1 (illustrated with broken lines). To make the task easier, an additional, inclined access ramp to the loading surface 9a is also provided in this case.

In a similar fashion, of course, enclosing walls 22 can also be provided on both sides of the loading boxes 9, which walls also serve as access ramps with the loading surface 9a in the lowered state (see the representation with broken lines in FIG. 3).

As can be appreciated, in the case of the vehicle in accordance with the invention, the maneuvering space required for loading and unloading is significantly smaller than in the case of conventional vehicles with an externally situated loading ramp, which can generally extend for up to 2 m and more behind the rear of the vehicle. In the present case, it is no longer necessary to make such a clear space available.

As can also be appreciated, it is also possible, should the need arise, and where the available maneuvering space is limited, to load and unload the loading ramp from one or both sides with the sliding door or sliding doors 16 open.

Once loading or unloading is complete, the loading box 9 can be raised once more to the driving position in a simple manner with the lifting cylinders 12 by means of the lifting device 11. Unlike the previously disclosed, externally situated loading ramps, it is no longer necessary in this case to move the cargo that is present on the loading surface 9a and to transfer it into the interior of the vehicle, but it can remain on the loading surface 9a, since the loading box 9 is internal and is situated in the interior of the vehicle after closing the opening surfaces with the sliding doors 16 and the roller door 20.

The customary rear lights 23, such as turn indicators, tail lamps, rear fog lamps, reversing lamps and similar, can be attached to the angled sections 18 of both sliding doors 16, as indicated in principle only in FIG. 3. A license plate 24 can also be arranged on one slat on the roller door 20.

The loading box 9 with the loading surface 9a can also be retro-fitted, should the need arise, to vehicles that are already in service. All that is required for this purpose is to cut the two longitudinal members 4 and 5 at the C-pillar and to attach the lifting device 11 with the lifting cylinders 12 together with the loading box 9 and the loading surface 9a to the C-pillar. In this case, the vehicle then has a vertically adjustable loading box 9 only behind the rear axle 3, although all of the previously described advantages are still satisfied in conjunction with this.

It is also possible, moreover, in addition to a superstructure on a vehicle with a ladder frame, to prefabricate the vehicle superstructure complete with the loading boxes 7, 8, 9 and, where appropriate, 10, and with the associated arrangements, such as lifting devices 11 with the lifting cylinders 12, as a single unit, and then to attach it to the ladder frame with the longitudinal members 4 and 5 and, where appropriate, the transverse members 6 of a vehicle. An auxiliary frame 25 with longitudinal members 25a and 25b, as illustrated in FIG. 4, which shows a prefabricated vehicle superstructure of this kind as a representation in principle, is used for this purpose.

Figure 4:
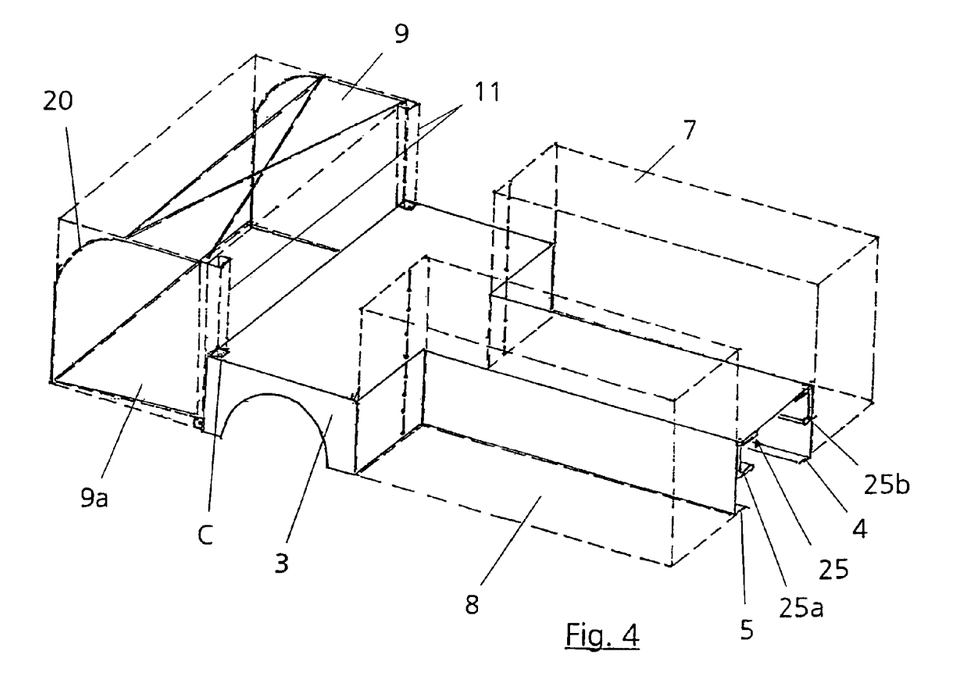
FIG. 4 is a perspective view of the vehicle superstructure illustrated as a representation in principle.
Figure 6:
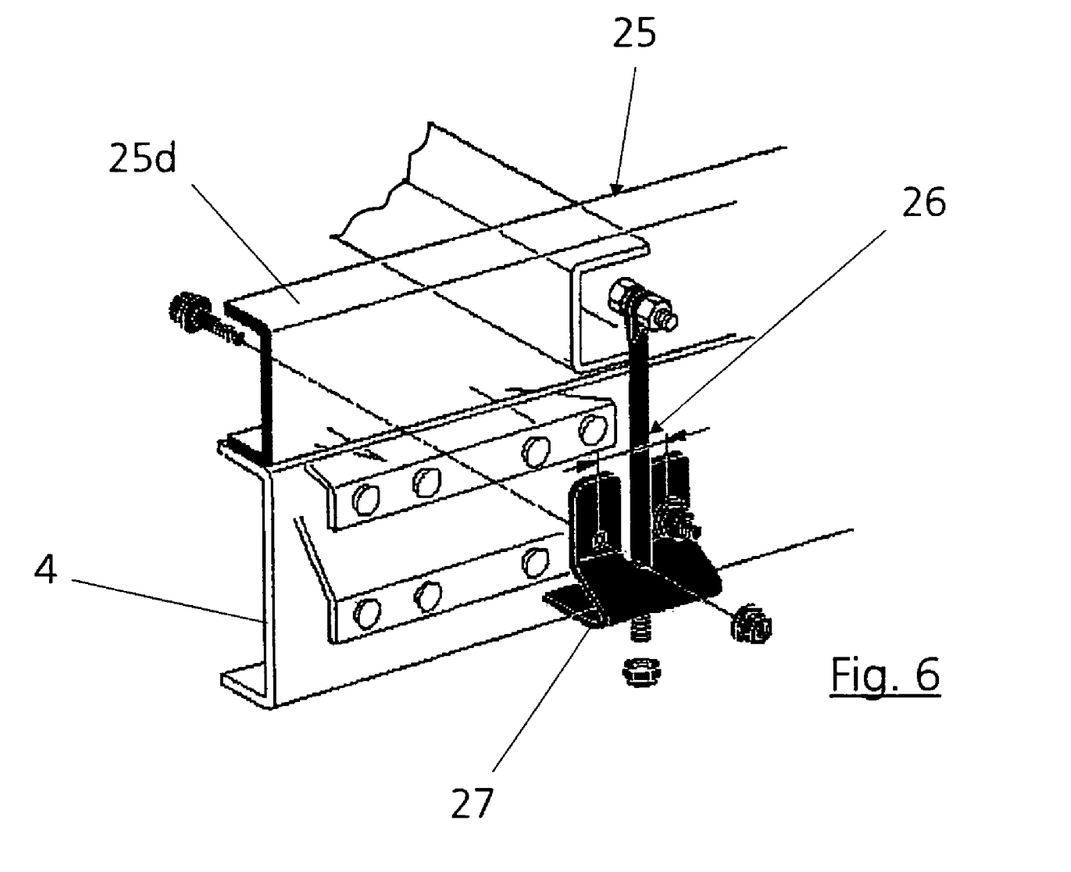
FIG. 6 is a detailed enlargement of an auxiliary frame with an attachment device for a prefabricated vehicle superstructure on a ladder frame.

For the purposes of assembling the prefabricated vehicle superstructure in accordance with FIG. 4, this is positioned on the ladder frame together with the auxiliary frame 25, in conjunction with which the two longitudinal members 25a and 25b are placed on the longitudinal members 4 and 5 of the ladder frame. The two longitudinal members 25a and 25b of the auxiliary frame can then be connected as required to the two longitudinal members 4 and 5. One possibility in this respect is illustrated in FIG. 6.

As can be appreciated, the connection in this case is effected by a plurality of screwed connections 26 with clamping devices, such as fixing plates 27, arranged at a mutual distance from one another, in conjunction with which the screws in the screwed connections 26 are attached in each case via corresponding holes and attachment rails to the longitudinal members 25a, 25b of the auxiliary frame and to the longitudinal members 4 and 5.

Like the loading boxes 7 and 8, the loading box 9 can also be raised, should the need arise, to the height of a ramp for the purposes of loading and unloading, in conjunction with which loading and unloading in this case can take place in the customary fashion towards the rear onto a ramp or similar after removing the roller door 20.

In place of a vehicle frame 1 with a ladder frame having longitudinal members 4 and 5 and transverse members 6, a single central member can also be provided, if required, as can be appreciated from DE 298 13 993 U.

Figure 5:
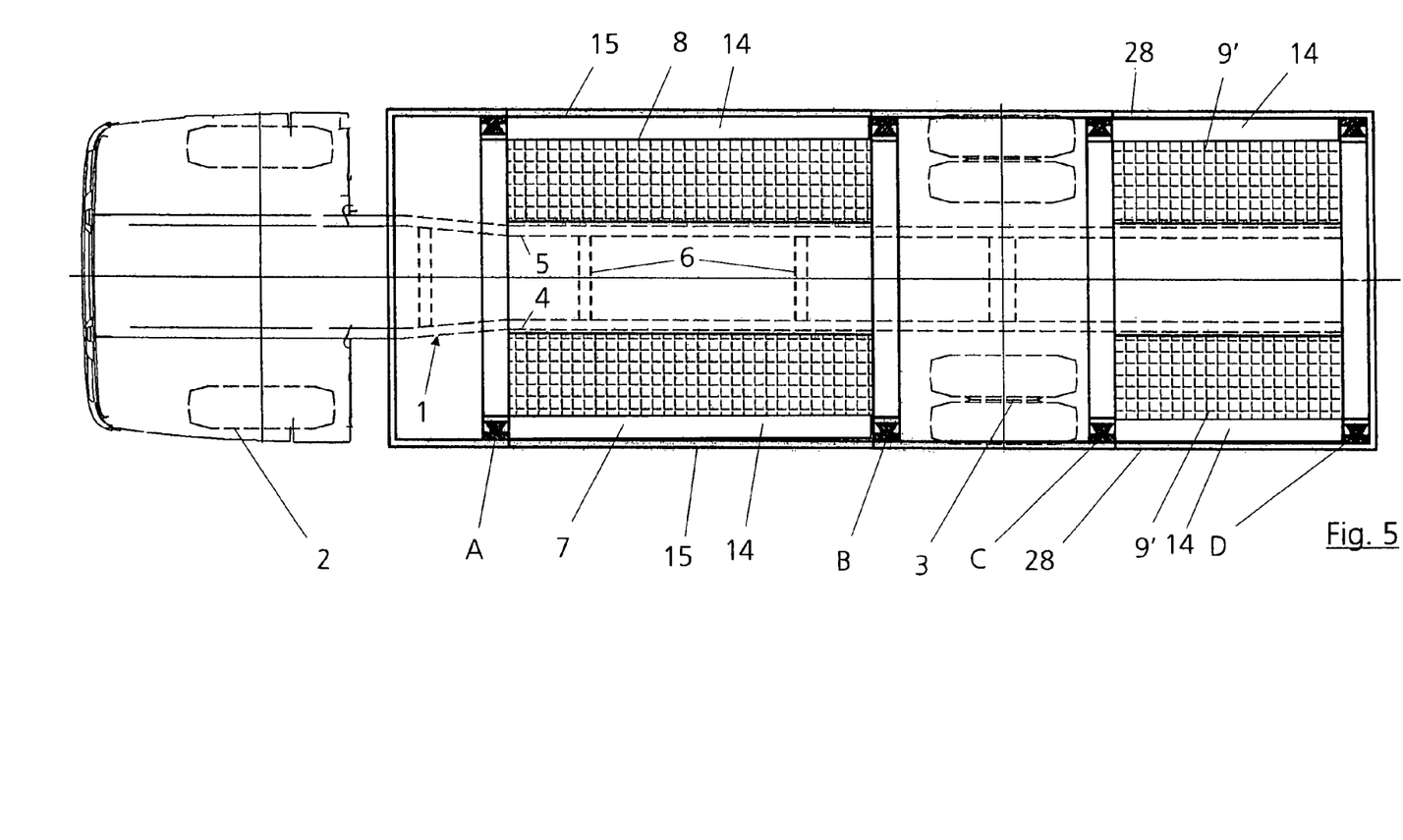
FIG. 5 is a modification of a vehicle in accordance with FIG. 1 for operation with a trailer.

If it is envisaged that the vehicle will also be operated with a trailer, the two longitudinal members 4 and 5 may no longer be cut off behind the rear axle 3, but must extend to the rear of the vehicle in the customary fashion. It is also possible in this case, however, to provide the vehicle with internal loading ramps, as can be appreciated from FIG. 5. Present behind the rear axle 3 in this case is a further vehicle rear section with a D-pillar, and present, however, to either side of the ladder frame with the longitudinal carriers 4 and 5 are loading boxes 9' that are capable of being lowered to the level of the road, which boxes are also attached to a lifting device 11 with lifting cylinders 12. The two loading boxes 9' in this case can be capable of vertical adjustment separately or jointly, as is also fundamentally the case with the two loading boxes 7 and 8. As can be appreciated, two internal loading ramps are created in this way, which are accessible from the side via opening surfaces. Instead of sliding doors 16, lateral roller doors 28 are sufficient in this case if required.

The invention claimed is:

1. A vehicle provided with at least one front axle and at least one rear axle, with at least two loading boxes or loading surfaces to accommodate cargo to be transported by the vehicle, with a vehicle frame and with one of the loading boxes or loading surfaces situated in a rear area of the vehicle frame behind the rear axle, in conjunction with which at least one part of each of the at least two loading boxes or loading surfaces is capable of being raised and lowered in a vertical direction by lifting devices arranged on the vehicle frame;

wherein each of the at least two loading boxes or loading surfaces (7, 8, 9), is arranged in such a way that the at least two loading boxes or loading surfaces (7, 8, 9) each function as an internal loading ramp, in conjunction with which at least one lateral opening, for providing access to one of the least two loading boxes or loading surfaces (7, 8, 9) and at least one rearward-facing opening, for providing access to another of the least two loading boxes or loading surfaces (7, 8, 9) arranged on the vehicle frame (1), a sliding door (16) encloses the at least one lateral opening, each opening facilitates loading or unloading of cargo on the respective loading box or loading surface (7, 8, 9), and a roller door (20) is provided for closing the rearward-facing opening at the rear of the vehicle, the sliding door (16) comprises means communicating with the roller door 20 providing guidance as the roller door 20 closes the rear-ward facing opening.

2. The vehicle according to claim 1, wherein the loading openings are exposed in a predetermined position of the lifting device (11).

3. The vehicle according to claim 1, wherein the means communicating with comprises the roller door (20) lateral guides.

4. The vehicle according to claim 1, wherein the sliding door (16) is provided at least on one side of the vehicle in the area of the at least one part of the loading box or loading surface (9) that is capable of being raised and lowered behind the rear axle.

5. The vehicle according to claim 4, wherein a sliding door (16) is provided on both sides of the vehicle in the area of the at least one part of the loading box or loading surface (9) that is capable of being raised and lowered behind the rear axle.

6. A vehicle provided with at least one front axle and at least one rear axle, with at least two loading boxes or loading surfaces to accommodate cargo to be transported by the vehicle, with a vehicle frame and with one of the at least two loading boxes or loading surfaces being situated in a rear area of the vehicle frame behind the rear axle, in conjunction with which at least one part of each of the at least two loading boxes or loading surfaces is capable of being raised and lowered in a vertical direction by lifting devices arranged on the vehicle frame;

each of the at least two load no boxes or loading surfaces (7, 8, 9) is arranged on the vehicle frame (1) to function as an internal loading ramp, in conjunction with which at least one lateral opening provides access to one of the least two loading boxes or loading surfaces (7, 8, 9) and at least one rearward-facing opening provides access to another of the least two loading boxes or loading surfaces (7, 8, 9) each opening facilitates loading or unloading of cargo on the respective loading box or loading surface (7, 8, 9), and a roller door (20) is provided for closing the rearward-facing opening at the rear of the vehicle;

a sliding door (16) is provided on both sides of the vehicle in the area of the at least one part of the loading box or loading surface (9) that is capable of being raised and lowered and is situated in the rear area of the vehicle frame behind the rear axle;

the sliding doors (16) are provided, at rear ends thereof, with vertical guide rails (19) for the purpose of guiding the roller door (20).

7. A vehicle provided with at least one front axle and at least one rear axle, with loading boxes or loading surfaces to accommodate cargo of the vehicle, with a vehicle frame and with one of the loading boxes or loading surfaces situated in a rear area of the vehicle frame behind the rear axle, in conjunction with which at least one part of each of the loading boxes or loading surfaces is capable of being raised and lowered in a vertical direction by lifting devices arranged on the vehicle frame;

wherein the at least one part of the loading box or loading surface (9) capable of being raised and lowered behind the at least one rear axle (3) is arranged in such a way that it is executed as an internal loading ramp, in conjunction with which at least one lateral opening surface and at least one rearward-facing opening surface arranged on the vehicle frame (1) in the region of the loading ramp are provided, which opening surfaces expose loading openings for the purpose of loading or unloading, and in conjunction with which a door-like arrangement (20) is provided as an opening surface at the rear of the vehicle;

a sliding door (16) is provided at least on one side of the vehicle in the area of the at least one part of the at least one loading box or loading surface (9) that is capable of being raised and lowered behind the rear axle; and the sliding door (16) is provided, at its rear end, with an inward-facing angled section(18), on which lighting devices (23) for the rear end of the vehicle are arranged.

8. The vehicle according to claim 4, wherein the sliding door is attached to a roof structure (13), behind the rear axle (3), and is guided in horizontal guide rails (19).

9. The vehicle according to claim 1, wherein the roller door (20) is accommodated, in a retracted state, in a roof structure (13) behind the rear axle (3).

10. The vehicle according to claim 1, wherein the lifting device (11), for the at least one loading box or loading surface (9) arranged behind the rear axle (3), is arranged on a C-pillar of the vehicle frame.

11. The vehicle according to claim 10, wherein the lifting device (11) is provided with lifting cylinders (12), which are arranged on vertical rails (30) on the C-pillar.

12. The vehicle according to claim 11, wherein the lifting device (11) on the C-pillar forms a portal structure (14) together with the rails on the C-pillar.

13. The vehicle according to claim 4, wherein an enclosing wall section (22) is pivotally coupled to the loading boxes or loading surfaces behind the rear axle adjacent each sliding door (16), and each enclosing wall section (22) pivots, when the loading boxes or loading surfaces behind the rear axle is in a lowered state, to form an access ramp to facilitate loading of the loading box or the loading surface (9).

14. The vehicle according to claim 1, wherein an enclosing wall section (21) is pivotally coupled to the loading boxes or loading surfaces behind the rear axle on the rear of the vehicle, and the enclosing wall section pivots, when the loading boxes or loading surfaces behind the rear axle is in a lowered state, to form an access ramp to facilitate loading of the loading box or loading surface (9).

15. The vehicle according to claim 4 having a ladder frame comprising a part of the vehicle frame, which exhibits two longitudinal members (4, 5) spaced from one another and transverse members (6) connecting the longitudinal members (4, 5) to one another, wherein the ladder frame is cut in the area of the at least one rear axle (3) to permit the installation of the the loading box or loading surface situated in the rear area behind the rear axle, and the lifting device (11) for the at least one loading box or loading surface (9) can be attached to a C-pillar of the vehicle frame (1) behind the rear axle (3).

16. The vehicle according to claim 4 having a ladder frame comprising a part of the vehicle frame, which exhibits two longitudinal members (4, 5) arranged at a distance from one another and transverse members (6) connecting the longitudinal members (4, 5) to one another, wherein the at least one loading box or loading surface situated in a rear area behind the rear axle, is arranged laterally on the ladder frame behind the at least one rear axle (3).

17. The vehicle according to claim 16, wherein there are at least three loading boxes or loading surfaces (7, 8, 9) and a loading box or a loading surface (9) is arranged on both sides of the ladder frame.

18. The vehicle according to claim 15 having an auxiliary frame (25) attachable to the longitudinal members (4, 5) of the ladder frame to form a chassis superstructure, which includes the loading boxes or loading surfaces (7, 8, 9, 10) and the lifting devices (11) for loading the boxes or loading surfaces, the auxiliary frame (25) is provided with a roof structure(13) and openings.

19. The vehicle according to claim 18, wherein the auxiliary frame (25) is detachably attached via connecting devices (26, 27) to the longitudinal members (4, 5) of the ladder frame.

20. The vehicle according to claim 19, wherein the connecting devices includes fixing plates (27) and screwed connections (26).

* * * * *

UNITED STATES PATENT AND TRADEMARK OFFICE
CERTIFICATE OF CORRECTION

PATENT NO. : 7,524,157 B2
APPLICATION NO. : 10/534838
DATED : April 28, 2009
INVENTOR(S) : Walter Hurler It is certified that error appears in the above-identified patent and that said Letters Patent is hereby corrected as shown below:

Column 1, line 32, change "depth of ca. 2 m" to "depth of ca. 2 m. (about 2m or 6.56 ft";

Column 1, line 49, change "more than 1 m," to "more than 1 m (3.28 ft),";

Column 4, lines 1 and 2, change "DETAILED DESCRIPTION OF THE PREFERRED ENBODEMENTS" to "DETAILED DESCRIPTION OF THE PREFERRED EMBODIMENTS";

Column 4, line 29, change "ramp height of 1100 mm," to "ramp height of 1100 mm (3.61 ft),";

Column 4, lines 57 and 58, change "lifting cylinder 12 arranged on either side in each case is also attached" to "lifting cylinder 12 is arranged on vertical rails 30 on a floor of the vehicle, as shown in Figs. 1, 3, and on either side of the vehicle in each case and is also attached";

Column 4, line 59, change "structure 14 connects the two" to "structure 14 connects, via the vertical rails 30 and the lifting device 11, the two";

Column 5, line 61, change "up to 2 m" to "up to 2 m (6.56 ft)";

Column 7, lines 42 and 43, change both occurrences of "roller door 20" to "roller door (20)";

Column 8, line 4, change "two load no boxes" to "two loading boxes"; and

Column 9, lines 21 and 22, change "of the the loading box" to "of the loading box".

Signed and Sealed this
Twelfth Day of July, 2011

David J. Kappos
*Director of the United States Patent and Trademark Office*